United States Patent
Bolz

(10) Patent No.: US 7,960,858 B2
(45) Date of Patent: Jun. 14, 2011

(54) DEVICE, SYSTEM AND METHOD FOR REDUCING THE CONSUMPTION OF CLOSED-CIRCUIT CURRENT OF A MOTOR VEHICLE

(75) Inventor: Stephan Bolz, Pfatter (DE)

(73) Assignee: Continental Automotive GmbH, Hannover (DE)

( * ) Notice: Subject to any disclaimer, the term of this patent is extended or adjusted under 35 U.S.C. 154(b) by 396 days.

(21) Appl. No.: 12/299,390

(22) PCT Filed: Jan. 11, 2008

(86) PCT No.: PCT/EP2008/050276
§ 371 (c)(1),
(2), (4) Date: Nov. 3, 2008

(87) PCT Pub. No.: WO2008/090035
PCT Pub. Date: Jul. 31, 2008

(65) Prior Publication Data
US 2009/0134701 A1 May 28, 2009

(30) Foreign Application Priority Data
Jan. 23, 2007 (DE) .................. 10 2007 003 424

(51) Int. Cl.
*H02H 7/18* (2006.01)
(52) U.S. Cl. ................................. 307/10.7
(58) Field of Classification Search .......... 307/10.1, 307/10.6, 10.7
See application file for complete search history.

(56) References Cited

U.S. PATENT DOCUMENTS

| 5,576,686 A | * | 11/1996 | Westermeir et al. | ....... 340/636.1 |
| 6,762,945 B2 | | 7/2004 | Morgen | |
| 2003/0067287 A1 | | 4/2003 | Morgen | |

FOREIGN PATENT DOCUMENTS

| DE | 4041620 A1 | 6/1992 |
| DE | 19915973 C1 | 11/2000 |
| DE | 10149282 A1 | 4/2003 |
| DE | 10255433 A1 | 6/2004 |
| EP | 0492103 A2 | 7/1992 |

OTHER PUBLICATIONS

International Search Report dated Sep. 9, 2008.
German Office Action dated Jul. 11, 2007.

* cited by examiner

*Primary Examiner* — Jared J Fureman
*Assistant Examiner* — Carlos Amaya
(74) *Attorney, Agent, or Firm* — Laurence A. Greenberg; Werner H. Stemer; Ralph E. Locher

(57) ABSTRACT

A device for reducing the consumption of closed-circuit current of a motor vehicle includes a first line, by way of which an ignition switch and a first terminal can be coupled; a second line, by way of which a supply voltage device and a second terminal can be coupled; a switching controller, which is disposed in a signal path of the second line; an actuatable bypassing device, which is switched in parallel to the switching controller and bypasses the switching controller as a function of a first control signal; and a control device, which generates the first control signal for actuating the bypassing device as a function of a first voltage, which corresponds to a difference in potential between a potential at the first terminal and a ground potential, and/or a current value of the current flowing on the second line, and/or a time allowance signal.

17 Claims, 8 Drawing Sheets

DEVICE, SYSTEM AND METHOD FOR REDUCING THE CONSUMPTION OF CLOSED-CIRCUIT CURRENT OF A MOTOR VEHICLE

BACKGROUND OF THE INVENTION

Field of the Invention

The present invention relates to a device, a system having such a device, and a method for reducing the consumption of closed-circuit current of a motor vehicle.

When the motor vehicle is at rest its electric distribution system is fed from its battery. Especially in the case of rest times—referred to in the following also as the motor vehicle's standby mode—of longer duration amounting to several days or weeks, the motor vehicle's battery will be discharged continuously so that as of a certain instant it will no longer have sufficient residual charge to start the engine.

FIG. 1 is a schematic block diagram of an electric distribution system BN of a motor vehicle for feeding a plurality of control devices SG1, SG2. Via the ignition switch Z and a fuse SR1 housed in the fuse box S a 12V battery B therein feeds a plurality of control devices SG1, SG2 by way of the switched supply line GL. At the same time the control devices SG1, SG2 are fed via a second fuse SR2 and the non-switched line UL. The non-switched line UL serves also to feed the control devices SG1, SG2 in the motor vehicle's standby mode. Current flows back via the motor vehicle's chassis.

A multiplicity of microcontroller-based control devices have been added to motor vehicles owing to their advancing electrification and the introduction of new functions or functionalities. At the time of the present application a typical mid-range vehicle now has around fifty control devices of said type. Numerous said control devices must retain at least a limited functionality even when the vehicle has been switched off or, as the case may be, is in standby mode. Examples thereof are the immobilizer and radio lock systems. Even in standby mode they require at least a monitoring function, which needs current.

Owing to the current needed by control devices of said type also in standby mode, a control device of said type has even in standby mode a sizable current consumption, for example in the 2-to-20-mA range. Because of the multiplicity of control devices in a motor vehicle the total current consumption of all current-consuming loads or, as the case may be, control devices in standby mode in a motor vehicle can amount to 50 to 200 mA. Based on a starter battery's storage capacity of conventionally 50 to 100 Ah and a residual charge necessary for starting the engine of, for instance, 20 percent, the result is a maximum rest time for the motor vehicle of 17 to 33 days. A larger battery consequently has to be used in the case of a vehicle that has a higher total current consumption, a factor which disadvantageously of necessity entails increased costs and an increased space requirement in the motor vehicle's engine compartment. Not using a larger battery will disadvantageously result in significant weaknesses when the motor vehicle is started after a rest time of longer duration.

Shown further in FIG. 2 for illustrating the problems underlying the present invention is a schematic block diagram of a control device SG1 having a voltage regulator UR and a microcontroller MC. A microcontroller MC of a modern control device SG1 requires, alongside a 5-V supply, further operating voltages, for example 3.3 V and 1.5 V, with its being possible during normal operation for the current consumptions in the case of the smaller voltages to be several 100 mA. Said operating voltages are as a rule generated by a linear voltage regulator UR operating as a rheostat. Depending on the maximum ambient temperature at the mounting location of the control device SG1 it is, though, difficult and technically complex to duct away the power dissipated at the linear controller SR fed from a voltage of routinely 12 V.

A switching controller SR—as shown in FIG. 3—exhibiting high efficiency must where applicable be connected upstream of the voltage regulator UR, with the relatively imprecise output voltage of the switching controller SR corresponding to the minimally necessary input voltage of the linear controller SR, whose output voltage in turn corresponds to the accuracy requirements of the microcontroller MC or microcontroller system fed therefrom. FIG. 3 shows for that purpose a schematic block diagram of a control device SG1 having a switching controller SR, a voltage regulator UR and a microcontroller MC. A solution of the cited kind is, though, disadvantageously very expensive for the corresponding control device SG1 owing to the respectively employed switching controller SR and respectively employed voltage regulator UR.

It would further be conceivable to employ the switching controller SR for reducing the standby current. The switching controller SR corresponds in principle to a transformer for direct voltage. Minus the inherent losses of the switching controller SR, the output power corresponds to the input power. So if an input voltage of 12 V is lowered to an output voltage of 6 V, then the input current will be reduced to half the output current. That corresponds to a halving of the current drawn from the battery B in standby mode, as a result of which the vehicle's rest time could be approximately doubled. There is, though, in practice a major obstacle to that approach in that the intrinsic current requirements of a switching controller SR of said type designed for several 100 mA are in the order of the standby current consumption of the entire control device SG1.

The applicant can alternatively also envisage incorporating into the respective control device SG1 an additional, smaller switching controller that has lesser intrinsic current requirements and in standby mode lowers the input voltage of the linear controller SR. However, because of the associated additional costs for each control device SG1, in particular when the motor vehicle has a multiplicity of control devices, for example 50, that solution is also very expensive and so uneconomical.

The applicant could finally also envisage incorporating into the vehicle or motor vehicle a central switching controller SR that in standby mode generates 6 V on the output side. Such an approach would, however, necessitate connecting all control devices SG1, SG2 via additional lines. That, though, would disadvantageously result in additional costs and an associated overhead for alterations to the motor vehicle's cable harness. It is for those reasons uneconomical to employ such an approach for prolonging the rest time.

In all there remain two further change options, namely to increase the starter battery's storage capacity and to reduce the closed-circuit current consumption.

Apart from the additional costs there are, though, two further obstacles to increasing the starter battery's storage capacity: those posed on the one hand by the available installation space and, on the other, by the additional weight. Modern vehicles or motor vehicles are developed from the standpoint that the enclosed space ought to be available for passengers and not for technical equipment. The additional weight of a larger battery will ultimately impact on fuel consumption so that very narrow limits are set here. That aside, a newly developed battery should be lighter and not heavier.

As regards reducing the closed-circuit current consumption it is customary practice for a control device's closed-circuit current consumption to have to reduce with each generation. That is, though, subject to limits on account of the semiconductor technology employed for the microcontrollers used and of the continuous growth in function sets or, as the case may be, functionalities. Moreover, new control devices consuming additional closed-circuit current are also introduced into the vehicle as new functions are introduced.

What can be observed overall is a continuous growth in closed-circuit current consumption in the motor vehicle accompanied by an almost constant battery capacity.

BRIEF SUMMARY OF THE INVENTION

An object of the present invention is accordingly to provide a substantial prolongation of a motor vehicle's rest time, in particular a doubling thereof, while maintaining the motor vehicle's operational readiness.

A further object is to provide a substantial prolongation of a motor vehicle's rest time, while maintaining the motor vehicle's operational readiness, without any intervention in the motor vehicle's control devices and/or without altering the battery or cable harness.

It is further an object to provide a substantial prolongation of the motor vehicle's rest time, while maintaining the motor vehicle's operational readiness, using simple technical means.

At least one of said objects posed is inventively achieved by means of a device having the features of claim 1 and/or by means of a system having the features of claim 13 and/or by means of a method having the features of claim 14.

Proposed accordingly is a device for reducing the consumption of closed-circuit current of a motor vehicle that has:
  a first line (2) by means of which an ignition switch (3) and a first terminal (4) can be coupled;
  a second line (5) by means of which a supply voltage device (6) and a second terminal (7) can be coupled;
  a switching controller (8) disposed in a signal path of the second line (5);
  an actuatable bridging device (9) that is connected in parallel with the switching controller (8) and bridges the switching controller (8) as a function of a first control signal (S1); and
  a control device (10) that generates the first control signal (S1) for actuating the bridging device (9) as a function of a first voltage (U1) corresponding to a difference in potential between a potential at the first terminal (4) and a ground potential and/or of a current value (I) of the current flowing on the second line (5) and/or of a time allowance signal (T).

Further proposed is a system for reducing the consumption of closed-circuit current of a motor vehicle that has:
  a device as described in more detail above;
  a supply voltage device coupled to the device's first line and second line; and
  an ignition switch disposed between the device's first line and the supply voltage device.

Further proposed is a method for reducing the consumption of closed-circuit current of a motor vehicle, comprising the following steps:
  providing a first line by means of which an ignition switch and a first terminal can be coupled;
  providing a second line by means of which a supply voltage device and a second terminal can be coupled;
  disposing a switching controller in a signal path of the second line;
  connecting an actuatable bridging device in parallel with the switching controller;
  generating a first control signal for actuating the bridging device as a function of a first voltage corresponding to a difference in potential between a potential at the first terminal and a ground potential and/or of a current value of the current flowing on the second line and/or of a time allowance signal;
  actuating the bridging device by means of the generated first control signal; and
  bridging the switching controller by means of the actuated bridging device.

An advantage of the present invention is that in the motor vehicle's standby mode, which is detected as a function of the first voltage and/or of the current value of the current flowing on the second line and/or of the time allowance signal, the switching controller is not bridged and so, owing to its inherent properties, provides a prolongation of the motor vehicle's rest time through a reduction in the input current of the switching controller and hence in its current consumption. The closed-circuit current consumption of the loads or devices connected to the second terminal or, as the case may be, second line is minimized through reducing of the switching controller's input current and hence of the current consumed from the supply voltage device or battery. The possibility hence also inventively ensues of reducing the size of the supply voltage device or battery while maintaining the rest time.

Altering of the cable harness or battery is also inventively unnecessary. The inventive device or, as the case may be, inventive system can be easily introduced into ongoing vehicle production because the invention can be embodied as a single, self-contained device that is embodied in particular as a fuse box of the motor vehicle or is contained in said box.

Using simple, economical circuits or devices such as the switching controller, bridging device, and control device will enable the inventive device or, as the case may be, inventive system to be produced economically using standard components. What is further advantageous for the inventive device's or, as the case may be, inventive system's fault tolerance is that the switching controller will simply be bridged by means of the bridging device if current consumption increases at the second terminal.

Advantageous embodiments and developments of the invention will emerge from the dependent claims and from the description with reference to the drawings.

According to a preferred embodiment of the invention the device is embodied as a fuse box or an intelligent switching unit of the motor vehicle. This embodiment of the invention will enable retrofitting in a vehicle simply by replacing the fuse box. An additional housing will advantageously be avoided thereby, which will result in a space saving in the motor vehicle.

According to a further preferred embodiment the bridging device is embodied as an actuatable relay.

According to a further preferred development the first line is embodied as a line switched by means of the ignition switch and/or the second line is embodied as a non-switched line.

According to a preferred embodiment of the invention a current measuring device is disposed in the signal path of the second line that measures the current value of the current flowing on the second line.

According to a further preferred embodiment the control device has:
  a level adapting device that receives the first voltage and converts the received first voltage into a first logic level;

a reference voltage source that provides a reference voltage corresponding to a predefined threshold value for the current value of the current flowing on the second line;

a voltage comparator that compares a third voltage corresponding to the current value measured by the current measuring device with the reference voltage for providing a second logic level;

an OR gate that logically ORs the first logic level and second logic level for providing a third logic level; and a switching device, in particular a transistor, which receives the third logic level at its control input and as a function of the received third logic level provides a second control signal for actuating the bridging device.

According to a further preferred embodiment the first logic level is a positive logic level if the first line is coupled to the supply voltage device and a negative logic level if the first line is decoupled from the supply voltage device. Furthermore the second logic level is preferably a positive logic level if the third voltage corresponding to the current value measured by the current measuring device is greater than the reference voltage and a negative logic level if the third voltage corresponding to the current value measured by the current measuring device is less than or equal to the reference voltage.

According to a further preferred development a timing element is provided that provides the time allowance signal as a fourth logic level, with the timing element setting the time allowance signal to a positive fourth logic level when the ignition switch is opened by means of a falling edge of the first voltage on the first line and maintaining said level until a standby mode of the motor vehicle has at least been attained. The timing element is embodied preferably as a mono-flop.

In the embodiment of the inventive device having the timing element the control device preferably has:

a level adapting device that receives the first voltage and converts the received first voltage into a first logic level;

an OR gate that logically ORs the first logic level and fourth logic level for providing a third logic level; and a switching device, in particular a transistor, which receives the third logic level at its control input and as a function of the received third logic level provides a second control signal for actuating the bridging device.

According to a further preferred embodiment the switching controller is embodied as a linear switching controller.

According to a further preferred embodiment the switching controller is embodied in such a way that it essentially halves its input voltage to an output voltage having a value of half the input voltage and essentially doubles an input current to an output current having a value of double the input current. An approximate doubling of the vehicle's rest time is hence inventively provided through a halving of the closed-circuit current consumption.

According to a further preferred embodiment the switching controller is embodied such that a maximum output current of the switching controller corresponds at least to a standby current consumption of the devices connected to the second terminal. The maximum output current is preferably 10 to 200 mA, by preference 80 to 120 mA, by particular preference 100 mA.

According to a further preferred embodiment the supply voltage device is embodied as a battery of the motor vehicle.

According to a further preferred development the first line is protected by means of a first fuse and/or the second line by means of a second fuse.

The invention is explained in more detail below with reference to the exemplary embodiments shown in the schematic figures, in which:

DESCRIPTION OF THE INVENTION

Unless indicated otherwise, identical—or functionally identical—elements and devices have been assigned the same reference signs in all figures.

Figure 1:
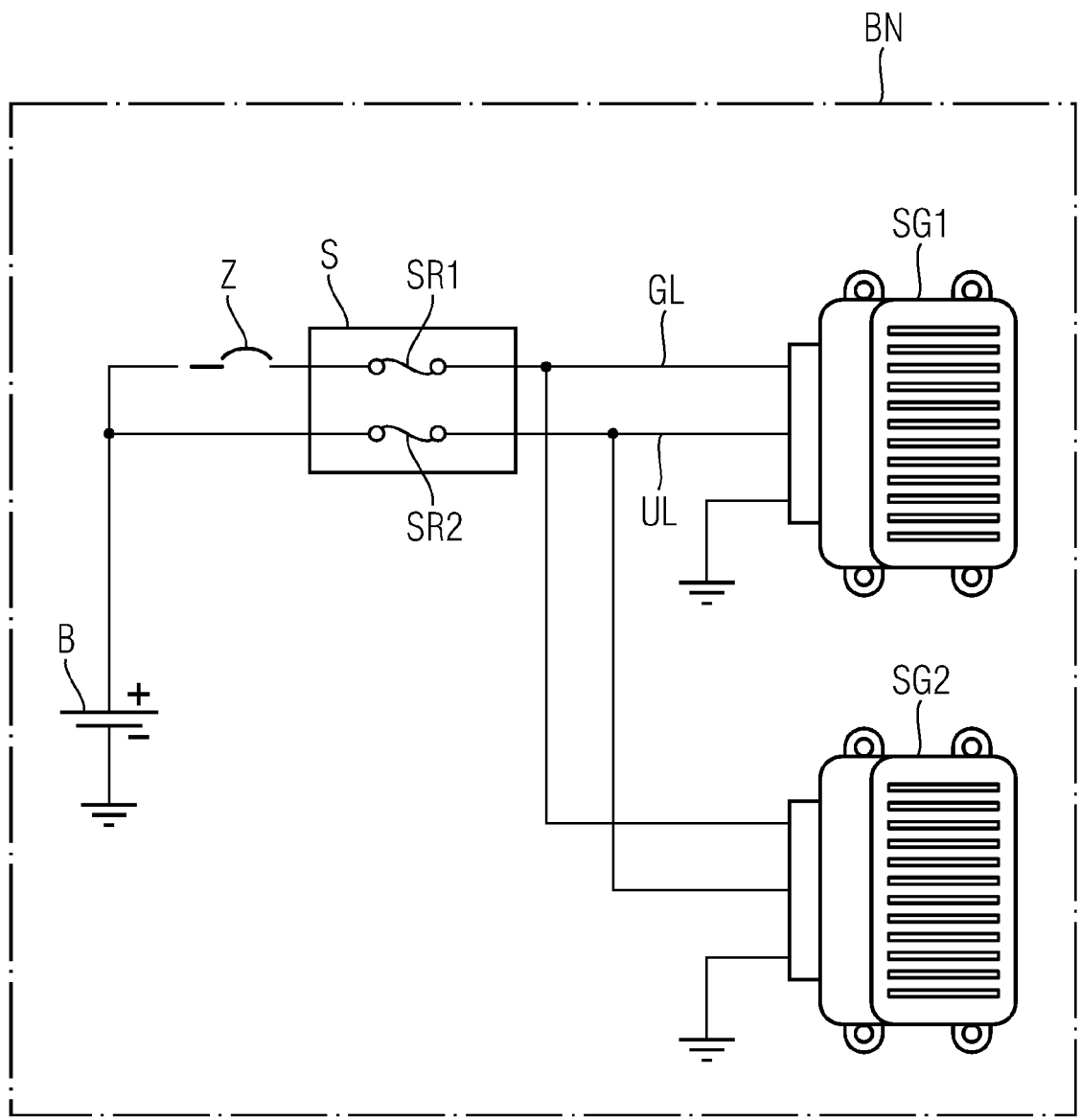
FIG. 1 is a schematic block diagram of a vehicle electric distribution system for feeding a plurality of control devices.
Figure 2:
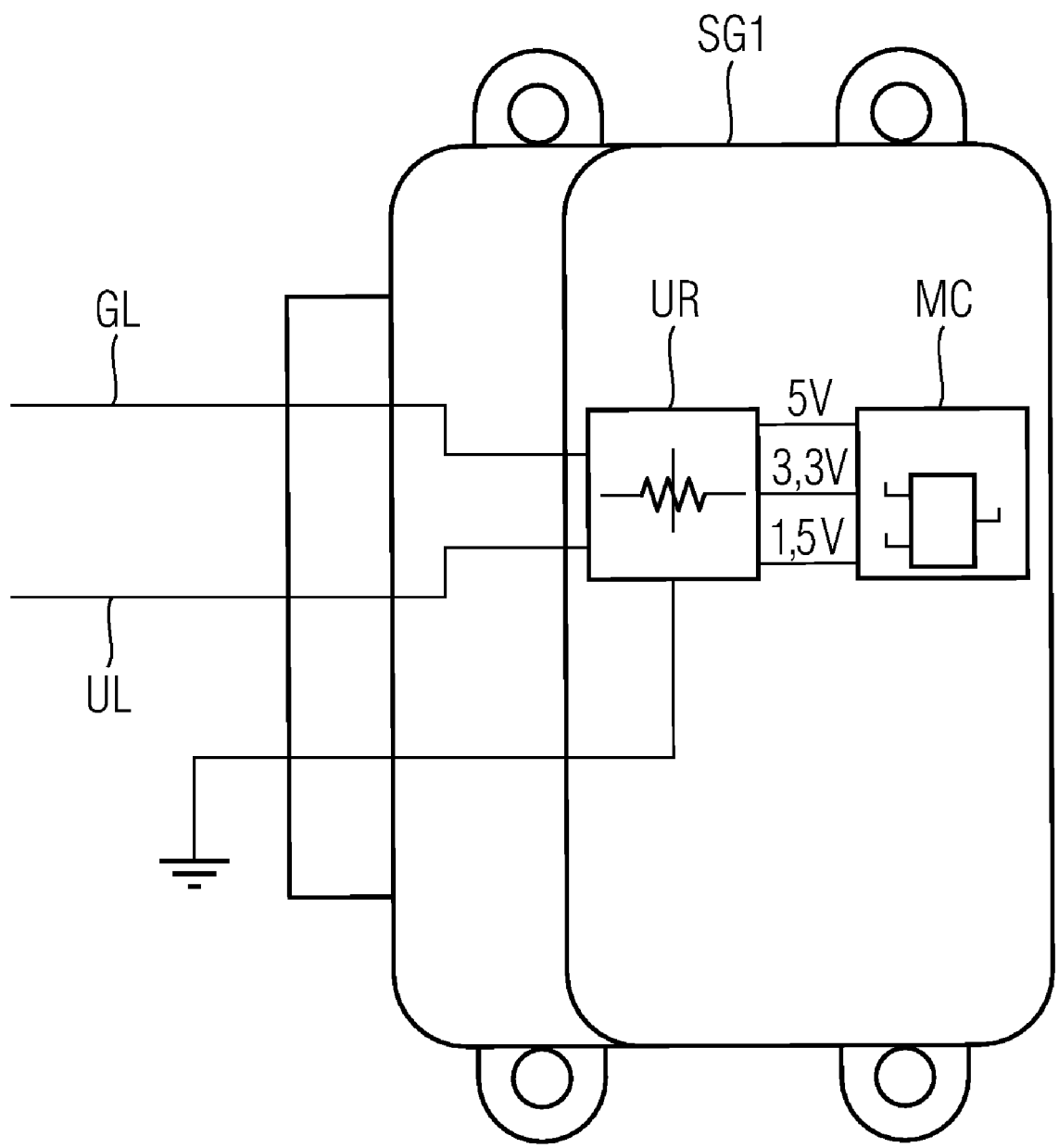
FIG. 2 is a schematic block diagram of a control device having a switching controller and a microcontroller.
Figure 3:
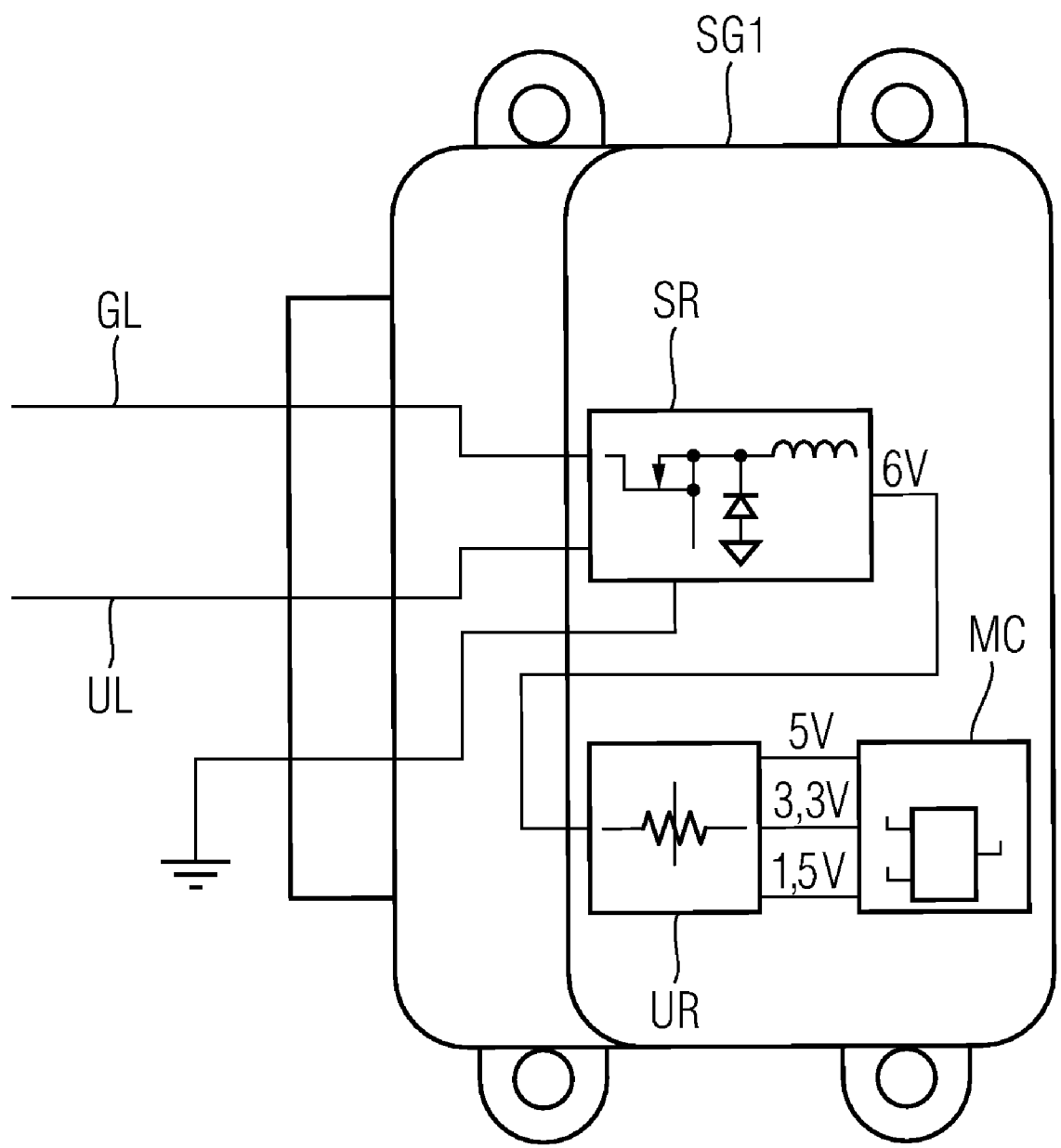
FIG. 3 is a schematic block diagram of a control device having a switching controller, a voltage regulator, and a microcontroller.
Figure 4:
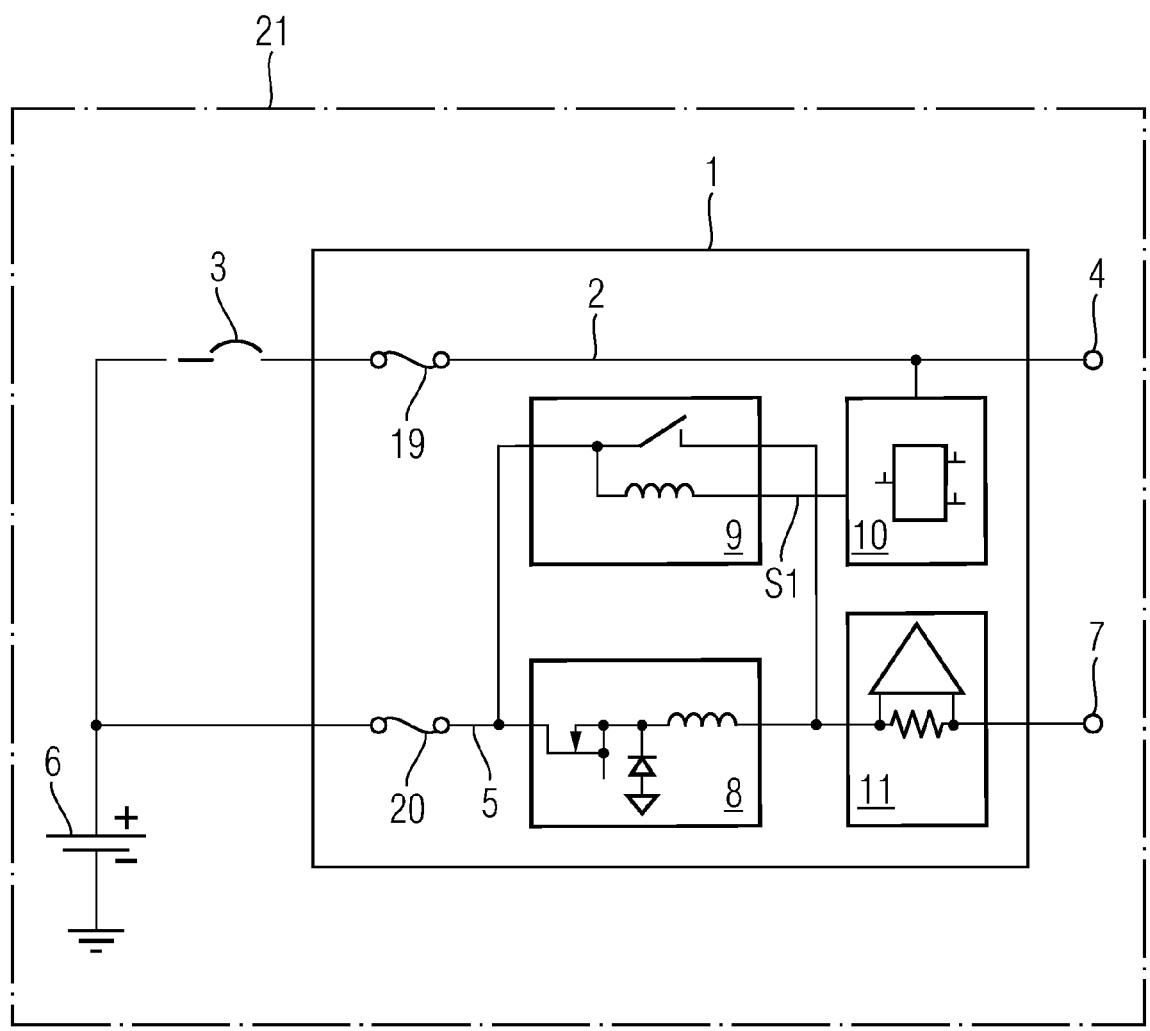
FIG. 4 is a schematic block diagram of a first exemplary embodiment of a system having an inventive device for reducing the consumption of closed-circuit current of a motor vehicle.
Figure 7:
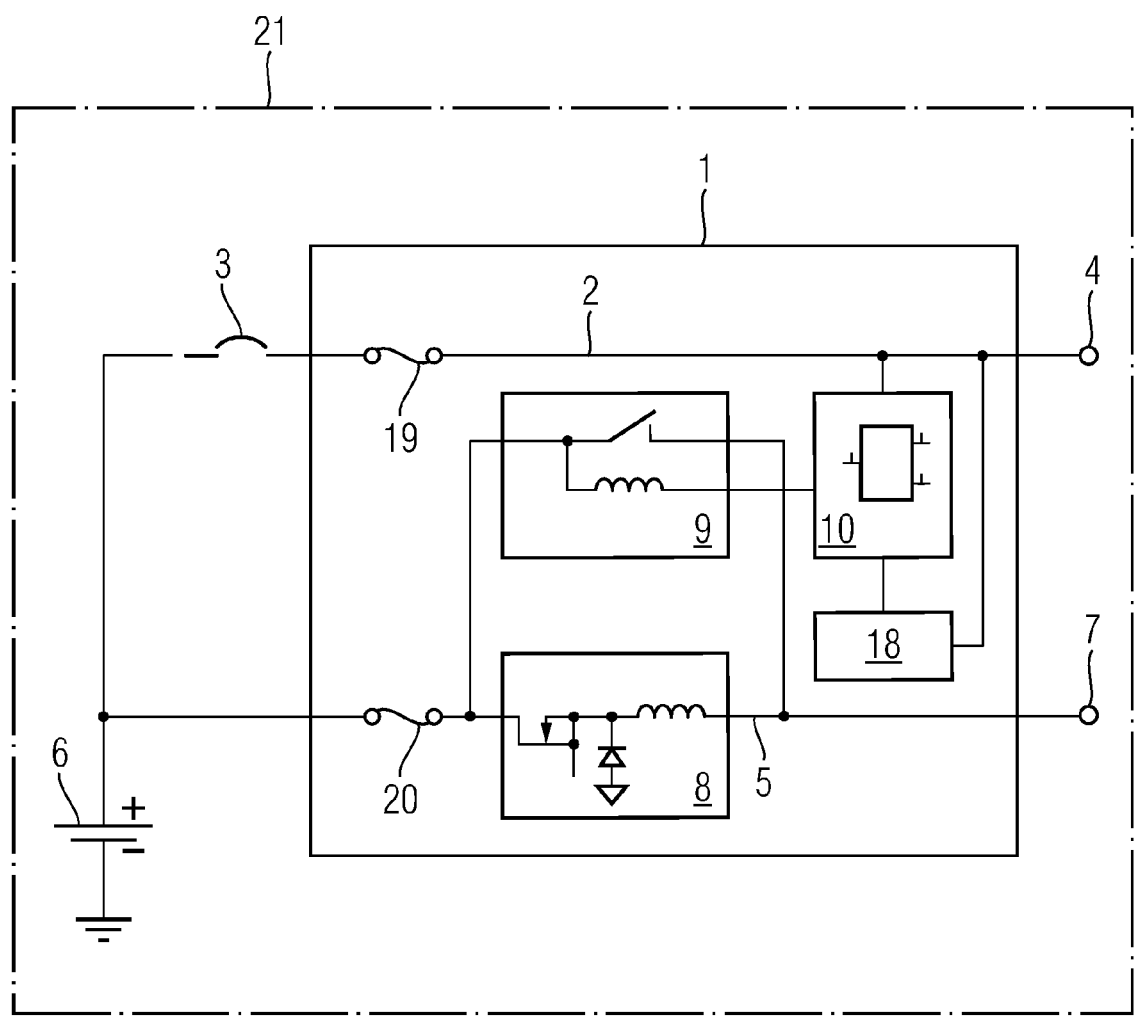
FIG. 7 is a schematic block diagram of a second exemplary embodiment of a system having an inventive device for reducing the consumption of closed-circuit current of a motor vehicle.

FIGS. 4 and 7 show a schematic block diagram of a first exemplary embodiment or, as the case may be, a second exemplary embodiment of a system 21 having an inventive device 1 for reducing the consumption of closed-circuit current of a motor vehicle. The first exemplary embodiment shown in FIG. 4 and the second exemplary embodiment shown in FIG. 7 of the inventive device 1 share the following features:

The device 1 has a first line 2, a second line 5, a switching controller 8, an actuatable bridging device 9 connected in parallel with the switching controller 8, and a control device 10. An ignition switch 3 and a first terminal 4 are coupled by means of the first line 2. A supply voltage device 6, embodied in particular as a battery of the motor vehicle, and a second terminal 7 are coupled by means of the second line 5. The switching controller 8 is disposed in a signal path of the second line 5. The bridging device 9 bridges the switching controller 8 as a function of a first control signal S1.

The control device 10 generates the first control signal S1 for actuating the bridging device 9 as a function of a first voltage U1 corresponding to a difference in potential between a potential at the first terminal 4 and a ground potential and/or as a function of a current value I of the current flowing on the second line 5 and/or as a function of a time allowance signal T.

The device 1 according to the first exemplary embodiment shown in FIG. 4 and according to the second exemplary embodiment shown in FIG. 7 is embodied preferably as a fuse box or an intelligent switching unit of the motor vehicle. The bridging device 9 is therein embodied in particular as an actuatable relay. The first line 2 is further embodied in particular as a line switched by means of the ignition switch 3. Preferably the second line 5 is furthermore embodied as a non-switched line.

The switching controller 8 is embodied preferably as a linear switching controller. The switching controller 8 is furthermore embodied particularly in such a way that it essentially halves its input voltage to an output voltage having a value of half the input voltage and essentially doubles an input current to an output current having a value of double the input current.

The switching controller 8 is furthermore embodied preferably such that a maximum output current of the switching controller 8 corresponds at least to a standby current consumption of the devices connected to the second terminal 7.

The supply voltage device 6 is embodied preferably as a battery of the motor vehicle. The first line 2 is furthermore protected by means of a first fuse 19 and/or the second line 5 by means of a second fuse 20.

The two exemplary embodiments of the device 1 according to FIGS. 4 and 7 differ particularly in that according to the first exemplary embodiment shown in FIG. 4 a current measuring device 11 and according to the second exemplary embodiment shown in FIG. 7 a timing element 18 is provided.

According to the first exemplary embodiment shown in FIG. 4 the current measuring device 11 is disposed in the signal path of the second line 5 that measures the current value I of the current flowing on the second line 5.

Figure 5:
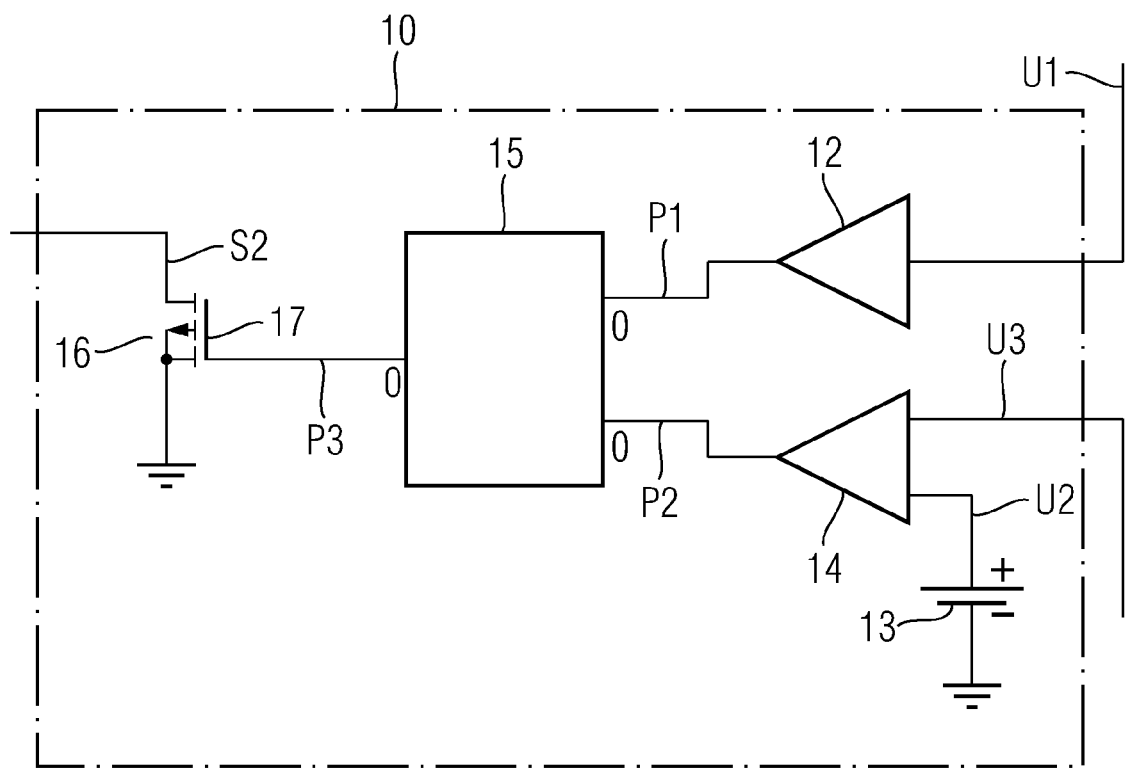
FIG. 5 is a schematic block diagram of a first exemplary embodiment of the control device shown in FIG. 4.

According to the first exemplary embodiment of the device 1 having the current measuring device 11 the control device 10 has preferably a level adapting device 12, a reference voltage source 13, a voltage comparator 14, an OR gate 15, and a switching device 16 (see FIG. 5). The level adapting device 12 receives the first voltage U1 and converts the received first voltage U1 into a first logic level P1. The reference voltage source 13 provides a reference voltage U2 corresponding to a predefined threshold value for the current value I of the current flowing on the second line 5. The voltage comparator 14 compares a third voltage U3 corresponding to the current value I measured by the current measuring device 11 with the reference voltage U2 for providing a second logic level P2. The OR gate 15 ORs the first logic level P1 and second logic level P2 for providing a third logic level P3. The switching device 16, embodied in particular as a transistor, receives the third logic level P3 at its control input 17 and as a function of the received third logic level P3 provides a second control signal S2 for actuating the bridging device 9.

The first logic level P1 is preferably a positive logic level if the first line 2 is coupled to the supply voltage device 6 and a negative logic level if the first line 2 is decoupled from the supply voltage device 6. The second logic level P2 is furthermore a positive logic level if the third voltage U3 corresponding to the current value I measured by the current measuring device 11 is greater than the reference voltage 2 and a negative logic level if the third voltage U3 corresponding to the current value I measured by the current measuring device 11 is less than or equal to the reference voltage U2.

Figure 6:
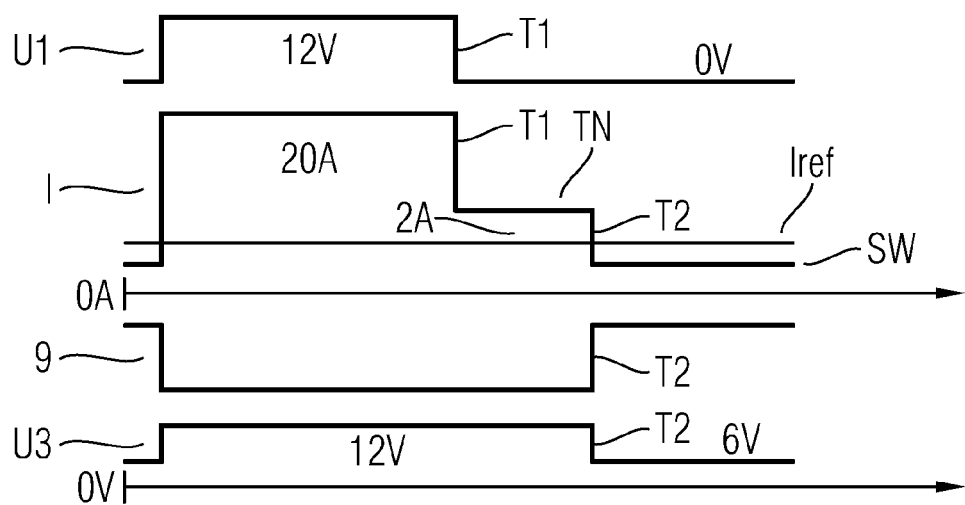
FIG. 6 shows schematic signal curves for when the inventive device shown in FIG. 4 is operating.

FIG. 6 shows for that purpose schematic signal curves for when the inventive device 1 shown in FIG. 4 is operating. The instant T1 therein signifies the instant at which the vehicle is switched off and the ignition switch 3 interrupts the battery feed to the first line 2. Said interruption is—as described above—detected by means of the control device 10. The current on said second line 5 is owing to the curve-following phase TN of the control devices fed via the second line 5 still raised somewhat about 1 to 5 A for a predefined period of time, for example for a few minutes, before finally dropping to the standby value SW. The time difference between T2 and T1 therein designates the curve-following phase TN.

The control device 10 is able to observe this via the current measuring device 11 and to compare the current with a lower threshold value Iref. The lower threshold value Iref is therein below the current value of the curve-following phase TN but above the standby current SW.

Particularly by way of the linking of a lack of battery voltage at the first terminal 4 through detecting the first voltage U1 and of an undershooting of the threshold value current Iref at the second terminal 7 the control device 10 is able to tell that the vehicle or motor vehicle is in standby mode. The bridging device 9 is thereupon switched off, which corresponds to an open relay or an open bridging device 9. For that purpose the bridging device 9 has as of the instant T2 a positive logic level which signals its "on" status.

The voltage at the second terminal 7 drops when the bridging device 9 has been switched off and the switching controller 8 starts operating. That stabilizes the voltage at the second terminal 7 at the above-cited exemplary 6 V.

The control devices connected to the second line 7 are hence fed with 6 V as of the instant T2 and the closed-circuit current being drawn from the battery 6 is approximately halved.

FIG. 7 is the schematic block diagram of the second exemplary embodiment of the system 21 having the inventive device 1. The second exemplary embodiment of the inventive device 1 differs from the first exemplary embodiment shown in FIG. 4 in that the current measuring device 11 is dispensed with and a timing element 18 provided. The timing element 18 provides the time allowance signal T as a fourth logic level P4. The timing element 18 therein sets the time allowance signal T to a positive fourth logic level P4 when the ignition switch 3 is opened by means of a falling edge of the first voltage U1 on the first line 2 and maintains said level until the standby mode of the motor vehicle has at least or reliably been attained.

Figure 8:
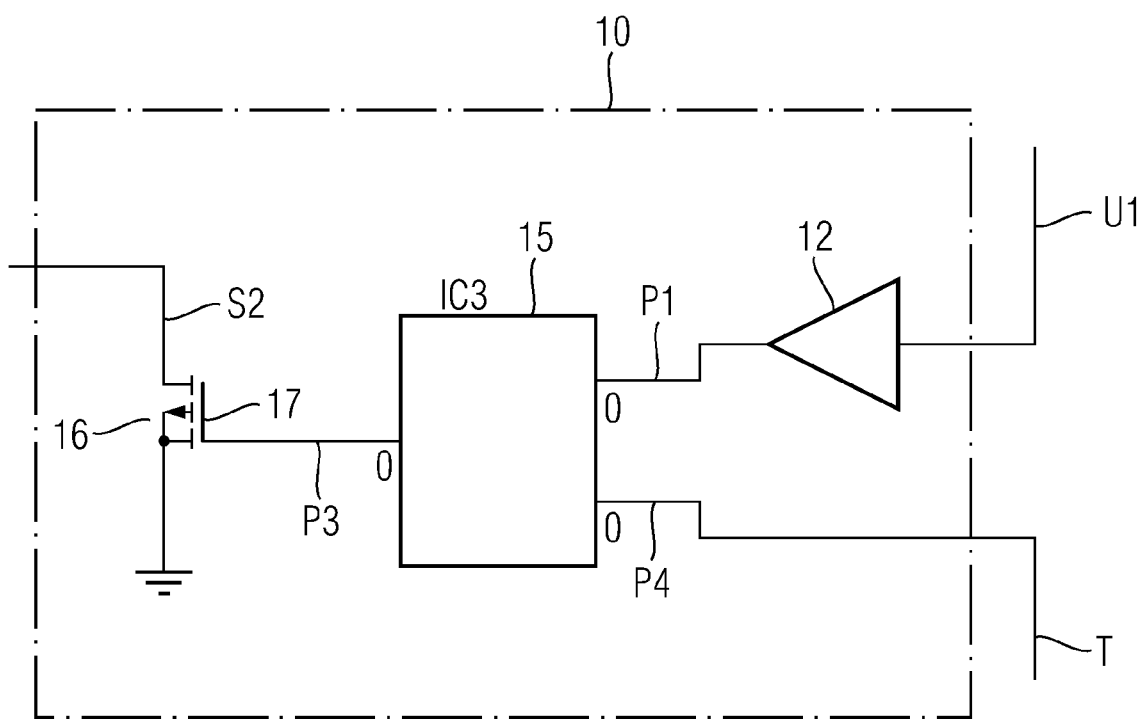
FIG. 8 is a schematic block diagram of a second exemplary embodiment of the control device shown in FIG. 7.

FIG. 8 shows for that purpose a schematic block diagram of a second exemplary embodiment of the control device 10 shown in FIG. 7 for the device 1 having the timing element 18. The control device 10 shown in FIG. 8 has a level adapting device 12, an OR gate 15, and a switching device 16. The level adapting device 12 receives the first voltage U1 and converts the received first voltage U1 into a first logic level P1. The OR gate 15 ORs the first logic level P1 and the fourth logic level P4 for providing a third logic level P3. The switching device 16, embodied in particular as a transistor, receives the third logic level P3 at its control input 17 and as a function of the received third logic level P3 provides a second control signal S2 for actuating the bridging device 9.

Figure 9:
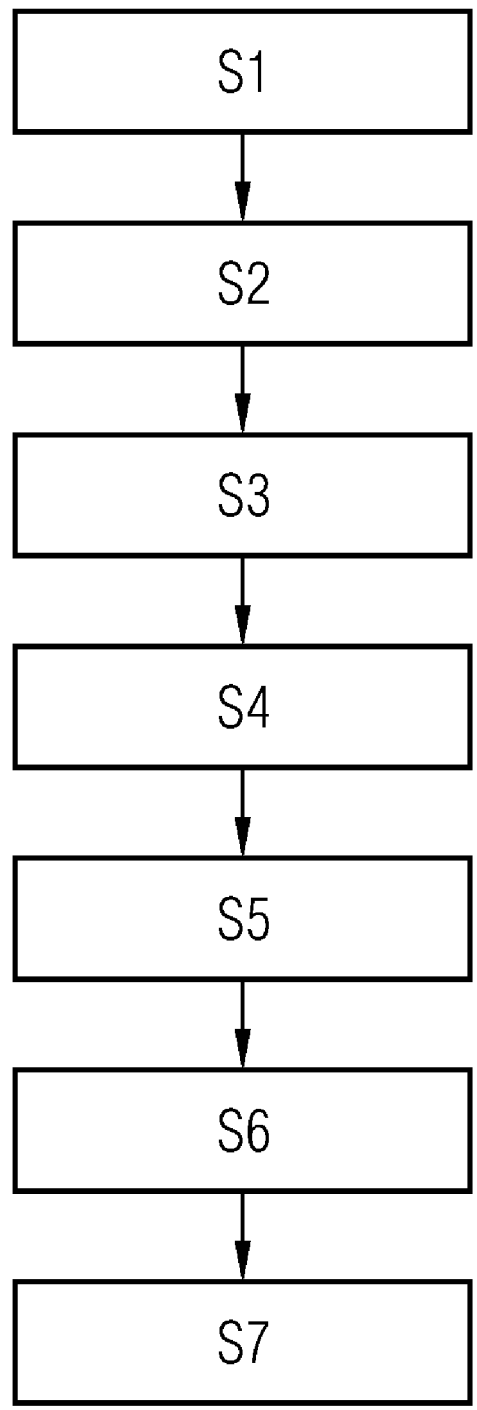
FIG. 9 is a schematic flowchart of a preferred exemplary embodiment of the inventive method for reducing the consumption of closed-circuit current of a motor vehicle.

FIG. 9 is a schematic flowchart of a preferred exemplary embodiment of the inventive method for reducing the consumption of closed-circuit current of a motor vehicle. The inventive method is explained below with the aid of the block diagram shown in FIG. 9 with reference to FIGS. 4 and 7. The inventive method according to FIG. 9 has the following steps S1 to S7:

Step S1 of the Method:
  A first line 2 is provided by means of which an ignition switch 3 and a first terminal 4 can be coupled.

Step S2 of the Method:
  A second line 5 is provided by means of which a supply voltage device 6 and a second terminal 7 can be coupled.

Step S3 of the Method:
  A switching controller 8 is disposed in a signal path of the second line 5.

Step S4 of the Method:
  An actuatable bridging device 9 is connected in parallel with the switching controller 8.

Step S5 of the Method:

A first control signal S1 is generated for actuating the bridging device 9 as a function of a first voltage U1 corresponding to a difference in potential between a potential at the first terminal 4 and a ground potential and/or of a current value I of the current flowing on the second line 5 and/or of a time allowance signal T.

Step S6 of the Method:

The bridging device 9 is actuated by means of the generated first control signal S1.

Step S7 of the Method:

The switching controller 8 is bridged by means of the actuated bridging device 9 such that the switching controller 8 is bridged in a standby mode of the motor vehicle and is not bridged while the motor vehicle is operating normally.

Although described above with reference to the preferred exemplary embodiments, the present invention is not limited thereto but can be multifariously modified. Another actuatable switch can, for example, conceivably be used instead of the relay 9 shown in FIGS. 4 and 7.

The invention claimed is:

1. A device for reducing a consumption of closed-circuit current of a motor vehicle, comprising:
    a first line for connecting an ignition switch and a first terminal;
    a second line for connecting a supply voltage device and a second terminal;
    a switching controller connected in a signal path of said second line;
    an actuatable bridging device connected in parallel with said switching controller, said bridging device having a control signal input and being configured to bridge said switching controller as a function of a first control signal; and
    a control device connected to said bridging device and configured to generate the first control signal for actuating said bridging device as a function of one or more of the following:
        a first voltage corresponding to a potential difference between a potential at said first terminal and a ground potential;
        a current value of a current flowing in said second line (5); and
        a time allowance signal.

2. The device according to claim 1, wherein one or more of the following is true: the device is embodied as a fuse box or an intelligent switching unit of the motor vehicle, said bridging device is a relay, said first line is a line switched by way of the ignition switch, and/or said second line is a non-switched line.

3. The device according to claim 1, which comprises a current measuring device connected in the signal path of said second line for measuring the current value of the current flowing in the second line.

4. The device according to claim 3, wherein said control device comprises:
    a level adapting device connected to receive the first voltage and configured to convert the first voltage into a first logic level;
    a reference voltage source providing a reference voltage corresponding to a predefined threshold value for the current value of the current flowing in said second line;
    a voltage comparator comparing a third voltage corresponding to the current value measured by said current measuring device with the reference voltage and providing a second logic level;
    an OR gate configured to logically OR the first logic level and the second logic level for providing a third logic level; and
    a switching device having a control input connected to receive the third logic level, said switching device providing a second control signal for actuating said bridging device as a function of the third logic level.

5. The device according to claim 4, wherein said switching device is a transistor.

6. The device according to claim 4, wherein the first logic level is a positive logic level if said first line is coupled to the supply voltage device and a negative logic level if the first line is decoupled from the supply voltage device, and/or the second logic level is a positive logic level if the third voltage corresponding to the current value measured by the current measuring device is greater than the reference voltage and a negative logic level if the third voltage corresponding to the current value measured by the current measuring device is less than or equal to the reference voltage.

7. The device according to claim 1, which comprises a timing element for generating the time allowance signal as a fourth logic level, said timing element setting the time allowance signal to a positive fourth logic level when the ignition switch is opened by means of a falling edge of the first voltage on the first line and maintaining said level until a standby mode of the motor vehicle has been attained.

8. The device according to claim 7, wherein said control device comprises:
    a level adapting device connected to receive the first voltage and configured to convert the first voltage into a first logic level;
    an OR gate configured to logically OR the first logic level and the second logic level for providing a third logic level; and
    a switching device connected to receive the third logic level at a control input thereof and configured to provide a second control signal for actuating the bridging device as a function of the third logic level.

9. The device according to claim 8, wherein said switching device is a transistor.

10. The device according to claim 1, wherein said switching controller is a linear switching controller.

11. The device according to claim 1, wherein said switching controller is configured to substantially halve an input voltage to an output voltage having a value of half the input voltage and to substantially double an input current to an output current having a value of double the input current.

12. The device according to claim 1, wherein said switching controller is embodied such that a maximum output current thereof corresponds at least to a standby current consumption of devices connected to said second terminal.

13. The device according to claim 1, wherein the supply voltage device is a battery of the motor vehicle.

14. The device according to claim 1, which comprises a first fuse connected to protect said first line.

15. The device according to claim 1, which comprises a second fuse connected to protect said second line.

16. A system for reducing a consumption of closed-circuit current in a motor vehicle, comprising:
    a device according to claim 1;
    a supply voltage device coupled to the first line and to the second line of the device; and
    an ignition switch connected between the first line of the device and the supply voltage device.

17. A method for reducing a closed-circuit current consumption of a motor vehicle, which comprises the following steps:

providing a first line for coupling an ignition switch and a first terminal;

providing a second line for coupling a supply voltage device and a second terminal;

connecting a switching controller in a signal path of the second line;

connecting an actuatable bridging device in parallel with the switching controller;

generating a first control signal for actuating the bridging device as a function of at least one of the following:

a first voltage corresponding to a difference in potential between a potential at the first terminal and a ground potential; and/or a current value of the current flowing on the second line; and/or a time allowance signal;

actuating the bridging device by way of the first control signal; and bridging the switching controller by way of the actuated bridging device.

* * * * *